United States Patent
Wojnowski et al.

(10) Patent No.: US 9,577,852 B2
(45) Date of Patent: Feb. 21, 2017

(54) COMMON-MODE SUPPRESSOR BASED ON DIFFERENTIAL TRANSMISSION LINE

(71) Applicant: Infineon Technologies AG, Neubiberg (DE)

(72) Inventors: Maciej Wojnowski, Munich (DE); Alexander Glas, Munich (DE); Hubert Werthmann, Munich (DE); Josef-Paul Schaffer, Bruckmuehl (DE); Francesca Arcioni, Munich (DE); Gabriele Bettineschi, Munich (DE)

(73) Assignee: Infineon Technologies AG, Neubiberg (DE)

( * ) Notice: Subject to any disclaimer, the term of this patent is extended or adjusted under 35 U.S.C. 154(b) by 107 days.

(21) Appl. No.: 14/531,343

(22) Filed: Nov. 3, 2014

(65) Prior Publication Data
US 2016/0127157 A1 May 5, 2016

(51) Int. Cl.
  H04L 25/08  (2006.01)
  H04L 25/02  (2006.01)
  H02H 9/04  (2006.01)

(52) U.S. Cl.
  CPC ........ H04L 25/085 (2013.01); H04L 25/0276 (2013.01); *H02H 9/046* (2013.01)

(58) Field of Classification Search
  CPC .. H01P 1/201; H01P 5/00; G11B 3/27; H02H 3/22; H02H 9/00; H02H 9/04; H03H 2/00; H03H 5/00; H03H 7/00; H03H 7/01; H03H 7/38; H04B 1/44; H04B 3/28; H04B 5/00; H04L 25/0276; H04L 25/06; H04L 25/08; H04L 25/085; H04L 25/02

USPC ......... 327/427; 330/296; 333/4, 12, 26, 32, 333/175, 181, 185; 375/219, 257, 295, 375/316; 455/41, 41.1, 83, 106; 342/51, 342/175

See application file for complete search history.

(56) References Cited

U.S. PATENT DOCUMENTS

| | | | | |
|---|---|---|---|---|
| 5,184,045 | A * | 2/1993 | Im | 315/39.51 |
| 7,956,704 | B1 * | 6/2011 | Acimovic | 333/181 |
| 2004/0155720 | A1 * | 8/2004 | Yasui et al. | 333/12 |
| 2011/0007439 | A1 * | 1/2011 | Asakawa et al. | 361/56 |

OTHER PUBLICATIONS

Skyworks. "Matching Differential Port Devices." Oct. 30, 2009.
Brooks, Douglas. "Differnetial Impedance: What's the Difference?" Printed Circuit Design, Aug. 1998.
Pulse A Technitrol Company. "Understanding Common Mode Noise." Apr. 1999.
Dunleavy, L. "S-Parameters." University of South Florida, Aug. 28, 2009.

* cited by examiner

*Primary Examiner* — Shawkat M Ali
(74) *Attorney, Agent, or Firm* — Eschweiler & Associates, LLC

(57) ABSTRACT

A common-mode suppressor for eliminating common-mode noise in high frequency differential data transmission systems and an associated method includes a long coiled differential transmission line configured to transfer data between a source and a load. The differential transmission line comprises a first conductive wire and a second conductive wire which are inductively and capacitively coupled and are laterally aligned or vertically aligned with each other. Further, the differential transmission line is matched for differential signals and un-matched for common-mode noise.

18 Claims, 11 Drawing Sheets

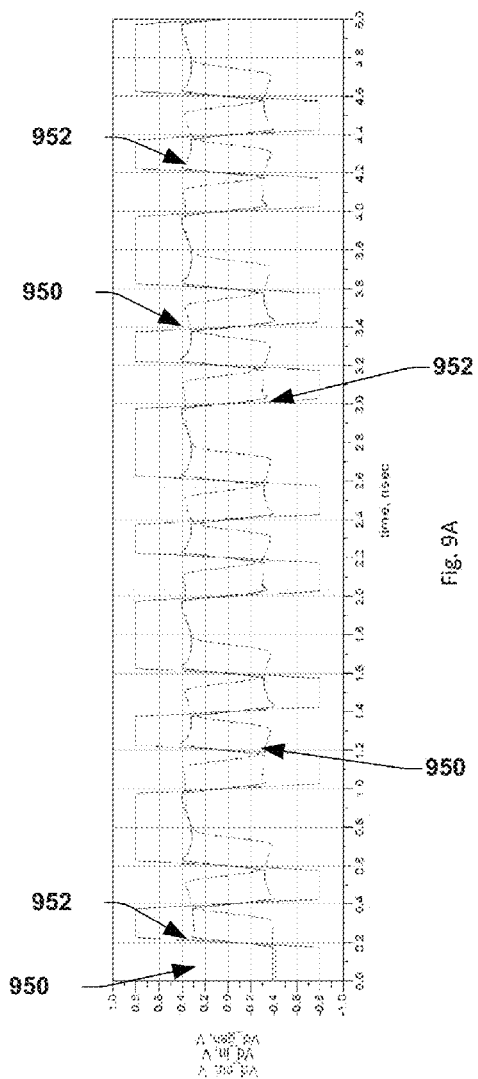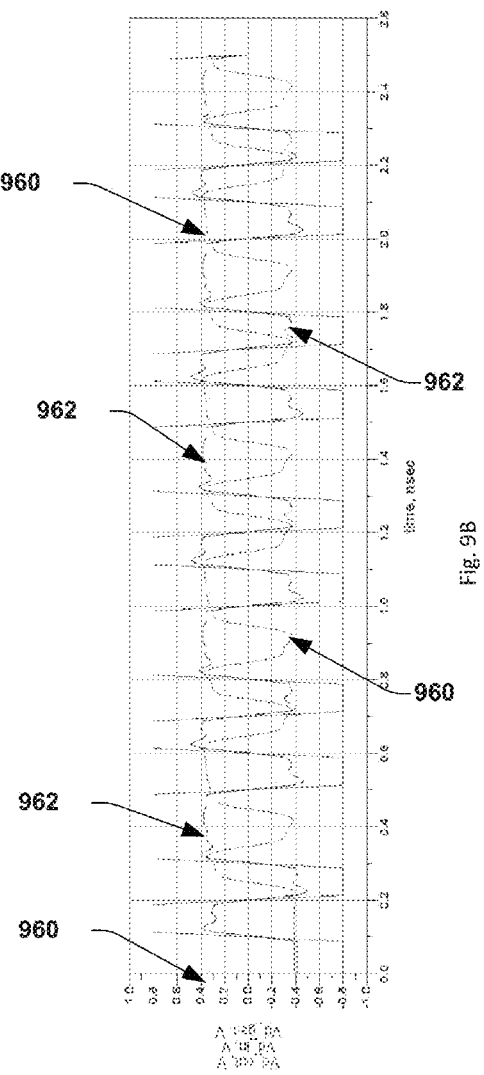

COMMON-MODE SUPPRESSOR BASED ON DIFFERENTIAL TRANSMISSION LINE

FIELD

The present disclosure relates to differential data transmission systems and in particular to a common-mode suppressor associated therewith and a method for suppressing common-mode noise.

BACKGROUND

In recent years there have been increasing demands for the transmission of high-frequency signals in conjunction with the diversification of electronic devices. Differential transmission/signaling is the preferred method for many high-frequency devices. Differential signaling is a method of transmitting information electrically with two complementary signals sent on, for example, two paired wires, called a differential pair. Differential signaling is also the primary choice for a low power RF interconnection because it provides superior immunity to noise by offering twice the signal swing for a given supply voltage. When differential transmission is used for the transmission of high-frequency signals, electromagnetic interference affecting external electronic devices can be reduced. Further, differential transmission can reduce the effects of electromagnetic interference from external electronic devices. However, the signal integrity of differential data transmission line/bus can be corrupted by common-mode noise. Common-mode noise can be generated by the system itself or by coupled radiation.

BRIEF DESCRIPTION OF THE DRAWINGS

In the following, the disclosure will be further explained and described by means of specific example embodiments with reference to the enclosed drawings.

FIG. 9A and FIG. 9B shows the time-domain analysis for a 5 GB/s signal and a 10 GB/s signal, according to one embodiment of the disclosure.

DETAILED DESCRIPTION

Figure 1:
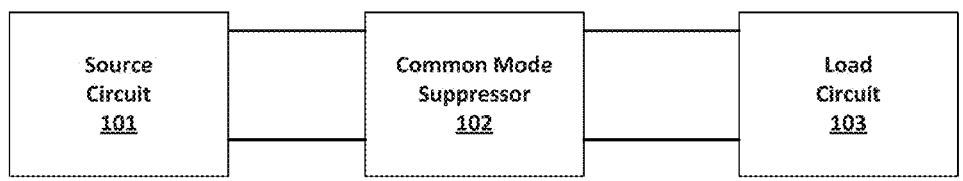
FIG. 1 shows a schematic diagram of a typical differential data transmission system with a common mode suppressor.

The present disclosure will now be described with reference to the attached drawing figures, wherein like reference numerals are used to refer to like elements throughout, and wherein the illustrated structures and devices are not necessarily drawn to scale.

This disclosure is directed towards an apparatus and method for suppression of common mode noise in differential data transmission systems. Differential data transmission system employs differential signaling wherein information is transmitted electrically with two complementary signals sent on two paired wires, called a differential pair. Apart from the differential signal which carries useful information, the differential pair is subjected to common-mode noise. Common mode noise is conducted on both the wires in the same direction and is the unwanted signal as it carries no information. Common-mode noise plays an important role in the generation of radio frequency interference (RFI) in communication systems using differential transmission, so eliminating common-mode noise is important. Further, the differential data transmission system is also subject to ESD (electrostatic discharge) strikes which need to be avoided.

In one embodiment of the disclosure, a differential data transmission system, comprises a source configured to transmit a differential signal containing data and a load configured to receive the differential signal. The system further comprises a common-mode suppressor comprising a long, coiled differential transmission line configured to transfer the differential signal from the source to the load.

In another embodiment of the disclosure, a common-mode suppressor for eliminating common-mode noise in high frequency differential data transmission systems, comprises a long differential transmission line configured to transfer data between a source and a load. The differential transmission line is matched for differential signals and un-matched for common-mode noise. Further, the differential transmission line is coiled. A differential transmission line is matched if it shows low signal reflections i.e. low return loss at its input and output. Good matching typically means a return loss of at least −20 dB to −30 dB.

In another embodiment of the disclosure, a method for suppressing common-mode noise in a differential data transmission system is disclosed. The method operates in conjunction with a common mode suppressor within the differential data transmission system, the common mode suppressor comprising a long, coiled differential transmission line configured to transfer a signal from a source to a load. The differential transmission line further comprises a first conductive wire and a second conductive wire which are coupled and are laterally aligned or vertically aligned with each other. The method comprises matching the differential transmission line of the common-mode suppressor for differential signals, wherein matching the differential transmission line for differential signals comprises tuning the differential impedance of the differential transmission line to match the load and the source impedances. The method further comprises mismatching the differential transmission line of the common-mode suppressor for common-mode noise, wherein mismatching the differential transmission line for common-mode noise comprises increasing the inductance of the differential transmission line for the common-mode signals.

The elimination of common-mode noise in differential data transmission systems is achieved through a common-mode suppressor, wherein the common-mode suppressor is a device configured to provide a low impedance for differential mode signals and a high impedance for common-mode noise. In conventional systems, the common-mode suppressor was implemented based on a common-mode choke concept. The common-mode choke consists of a pair of coupled inductors that provides a low inductance for differential mode signals and a high impedance for common-mode signals. The key factor for a common-mode choke is the magnetic coupling between the two inductors. The higher is the magnetic coupling the better is the common-mode rejection and the impedance matching for the differential mode.

In one implementation, the common-mode choke comprises a magnetic core having two conducting wires wound thereon, with the same number of turns. In the case of differential mode signal, the currents flowing through the two conducting wires offset each other with opposite phases, thus generating no magnetic flux, and the impedance of two conducting wires can be maintained to be low. Therefore, the differential signals can be easily passed. In the case of the common mode signal, currents flow through the two conducting wires, with the same phases, thus generating the magnetic flux in the magnetic body, and the impedance of the two conducting wires becomes high, making it difficult to pass the common-mode signals. Therefore, the common mode signal is attenuated. However, the common mode choke requires the use of materials with ferromagnetic characteristics (e.g., magnetic molds, core-ferrites) which makes it bulky and unsuitable for high-frequency applications. Further, certain common-mode choke topologies show high dispersion (non-constant group delay) which corrupts the time domain performance, making it unsuitable for high-speed interface applications like USB, HDMI etc. In addition, in the conventional systems, the ESD protection was based on non-silicon solutions like varistors or sparkgaps having clamping voltage which is too high for sensitive systems.

To provide a common-mode suppressor suitable for high frequency applications, a common-mode suppressor comprising a long coiled transmission line is introduced in the present disclosure. In some implementations, this long coiled transmission line replaces the common-mode choke used in conventional differential data transmission systems. In the present disclosure, a lumped system comprising the common-mode choke with coupled inductors is replaced by a distributed system comprising the long coiled transmission line. The lumped element model is valid only when $L_c \ll \lambda$, where $L_c$ denotes the circuit's physical length and $\lambda$ denotes the circuit's operating wavelength. At high frequencies, wavelengths of the signals through the circuit become comparable to the physical dimensions of the circuit elements, making the lumped model inaccurate. Therefore, transmission line is used in place of coupled inductors in the present disclosure, to make the common-mode suppressor suitable for high frequency applications. For the distributed model to be applicable, the length of the transmission line should be at least greater than one-tenth of the wavelength $\lambda$ of the signals being transmitted through the circuit for a predetermined frequency range of the differential signal. The predetermined frequency range comprises frequencies wherein the wavelengths of the signals through the circuit become comparable to the physical dimensions of the circuit elements. In one example, the length of differential transmission line is 7 mm which corresponds to $\lambda/10$ at approximately 2.5 GHz. Below this frequency lumped-element description is sufficient and we can treat our differential transmission line as a pair of simple coupled inductors. However, our suppressor is going to work at frequencies up to 10 GHz, where the physical length of 7 mm corresponds to $0.4\lambda$ ($>\lambda/10$). Thus, we use distributed-element description and use transmission-line theory to accurately model our suppressor for the frequency range above 2.5 GHz. Therefore, in this example, for the predetermined frequency range 2.5 GHz-10 GHz, the differential transmission line of length 7 mm can accurately model our common-mode suppressor. Further, in this embodiment, replacing the common mode choke with a long coiled transmission line eliminates the use of ferromagnetic materials.

FIG. 1 depicts a differential data transmission system 100 which includes a source circuit 101, a load circuit 103 and a common-mode suppressor 102 connected between the source circuit 101 and the load circuit 103. The source circuit 101 is configured to send information differentially using two coupled wires and the load circuit 103 is configured to receive the differential signal sent by the source circuit 101. In one embodiment, the common-mode suppressor 102 comprises a long coiled differential transmission line. Common-mode suppressor 102 is configured to suppress the common-mode noise on the differential transmission lines. The differential data transmission system 100 can be a part of any high speed data communication systems like HDMI, USB etc.

Figure 2:
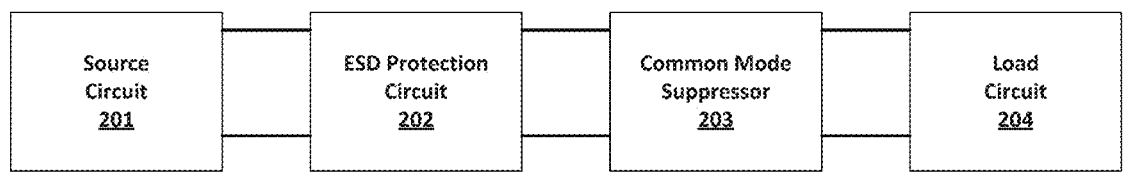
FIG. 2 shows a schematic diagram of a differential data transmission system with a common-mode suppressor and electrostatic discharge (ESD) protection.

Besides common-mode noise, differential data transmission systems are subjected to ESD strikes. FIG. 2 depicts a differential data transmission system 200 with an ESD protection circuit. The system 200 comprises a source circuit 201, a load circuit 204 and a common-mode suppressor 203. Further, the system 200 comprises an ESD protection circuit 202 connected to the input pins of the common-mode suppressor 203, configured to protect the differential data transmission system 200 from ESD strikes.

Figure 3:
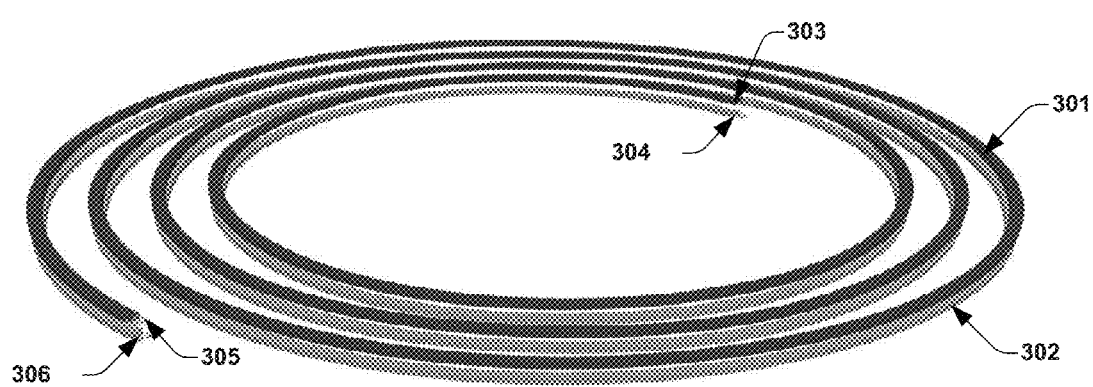
FIG. 3 shows the schematic diagram of a common mode suppressor comprising a long coiled differential transmission line, according to one embodiment of the disclosure.

FIG. 3 shows a particular embodiment wherein a common-mode suppressor 300 comprises a long coiled differential transmission line. The differential transmission line comprises a first conductive wire 301 and a second conductive wire 302 which are both inductively and capacitively coupled to one another and are vertically aligned with respect to one another. The lines are coupled intentionally, both inductively and capacitively to get a desired differential impedance $Z_{0diff} = \sqrt{L/C}$. The coupling is achieved by adjusting the layout of the transmission lines in such a way that the capacitance C between them and their inductance L gives desired impedance $Z_{0diff} = \sqrt{L/C}$. In other embodiments, the first conductive wire 301 and the second conductive wire 302 can be laterally aligned with respect to one another. Further, the differential transmission line comprises a first input pin 303 and a second input pin 304 at the input side of the first conductive wire 301 and the second conductive wire 302 respectively. In some embodiments, the input pins 303 and 304 are connected to an ESD protection circuit and in other embodiments, the input pins 303 and 304 are connected directly to a source circuit. Furthermore, the differential transmission line comprises a first output pin 305 and a second output pin 306 at the output side of the first conductive wire 301 and the second conductive wire 302 respectively. The output pins 305 and 306 are connected to a load circuit.

In one embodiment, FIG. 4 shows the layout of a common-mode suppressor 400 which comprises a first conductive wire 401 and a second conductive wire 402 which are inductively coupled to one another and are laterally aligned with respect to one another. Further the first conductive wire 401 comprises a first input pin 403 and a first output pin 405 and the second conductive wire 402 comprises a second input pin 404 and a second output pin 406. The common-mode suppressor 400 is configured to provide a low impedance for differential mode signals and a high impedance for common-mode noise. Particularly in this embodiment, the common-mode suppressor 400 is configured in a way that the first conductive wire 401 and the second conductive wire 402 are matched for differential signals and are mismatched for common-mode signals. To provide impedance matching in the differential mode, the differential impedance of the differential transmission line is tuned to match the load and source impedances, so that the differential signals see no impedance discontinuity. The signal at input/output of the device must see the same impedance as that of the transmission line it is travelling on, i.e. no impedance discontinuity. The load and source impedances are typically equal, so that they can be referred to as the system impedance. In one embodiment, the differential impedance is tuned to be equal to 100 ohms, however, in other embodiments, it could be different and is a function of the load and source impedances (i.e., the system impedance). In one embodiment, tuning the differential impedance is achieved by varying the cross-section of the first conductive wire 401 and the second conductive wire 402 and/or varying the distance between the first conductive wire 401 and the second conductive wire 402.

Once the differential matching is achieved, the transmission lines have to be mismatched for common-mode noise. Mismatching the differential transmission lines in common-mode is achieved by increasing the impedance of the differential transmission line for the common-mode signals. Particularly in this embodiment, the inductance of the differential transmission line is increased in order to increase the impedance for common-mode signals. Increasing the inductance of the differential transmission line for the common-mode signals comprises increasing the length of the differential transmission line comprising the first conductive wire 401 and the second conductive wire 402. However, simply increasing the length of the differential transmission line also increases its resistance for the differential signals, which is not desired. In order to increase the inductance of the differential transmission line without significantly increasing the resistance, the differential transmission line is coiled, thereby forming a coiled, differential transmission line having a plurality of windings. Coiling the transmission line increases the overall inductance and hence the transmission line works as a large inductor against common mode signals. The inductance increases as the number of windings in the coil increases.

Figure 4A:
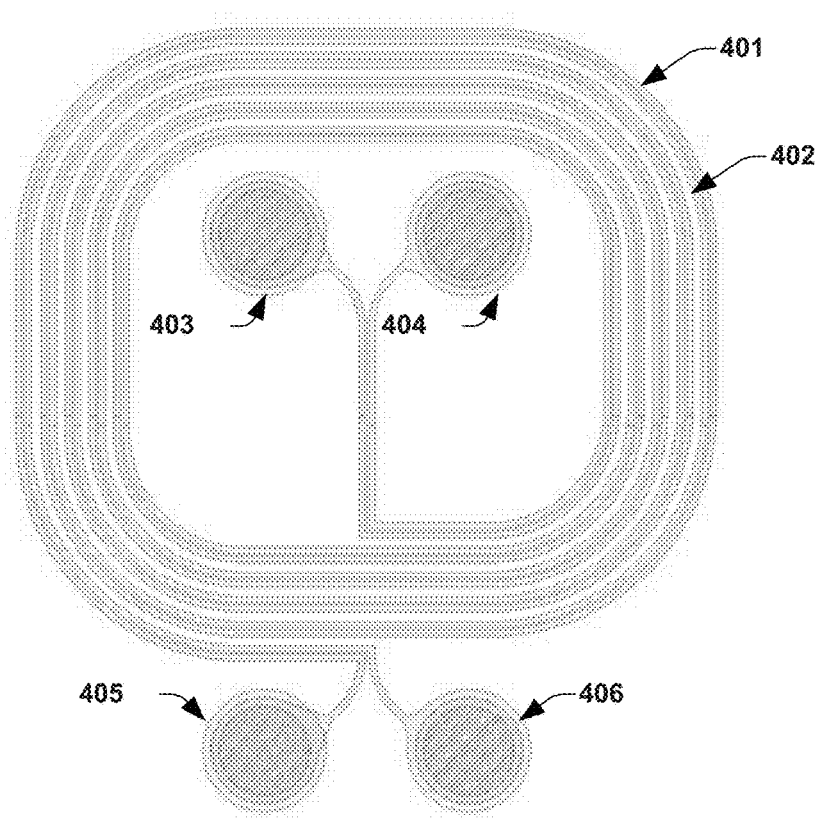
FIG. 4A shows the layout of a common mode suppressor comprising a long coiled differential transmission line, according to one embodiment of the disclosure.
Figure 4B:
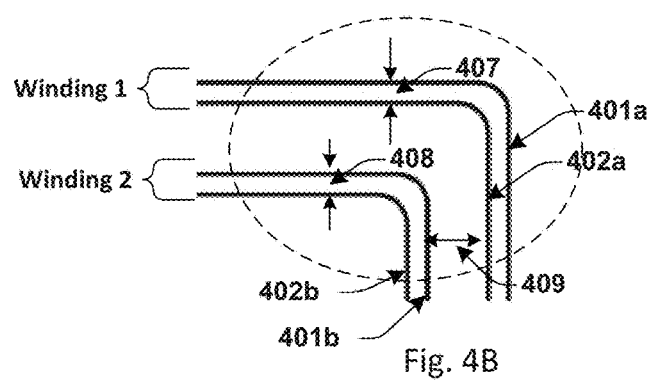
FIG. 4B shows the exploded view of the differential transmission line of FIG. 4A.

FIG. 4B shows an exploded view of the common-mode suppressor of FIG. 4A comprising a long coiled differential transmission line. Coiling the differential transmission line does not affect the differential signals as long as the coupling between the different sections of the differential transmission line is negligible. On the other hand, to provide high impedance for common-mode noise, the coupling between neighboring windings in the coil must be made very high. For example, the conductive wires 401 and 402 in FIG. 4A make one winding. FIG. 4B shows two neighboring windings, winding 1 and winding 2 of the common mode suppressor 400 of FIG. 4A. The distance 409 represents the distance between winding 1 and winding 2. Winding 1 comprises a first section 401a of the first conductive wire 401 and a first section 402a of the second conductive wire 402 of the common-mode suppressor 400. Similarly, winding 2 comprises a second section 401b of the first conductive wire 401 and a second section 402b of the second conductive wire 402 of the common-mode suppressor 400. In order to provide high impedance for common-mode signals without affecting the differential signals, in one embodiment, the distance 409 between windings 1 and 2 is made relatively larger compared to the distance 407 and 408 between the two conductive wires of winding 1 and winding 2 respectively. By decreasing the distance between the windings 409, we increase the common-mode impedance and make the structure smaller (positive effect), but also increase the coupling between the coiled differential lines (negative effect). The electromagnetic (EM) field in differential mode is confined between two conductors of a winding. If 407 is small compared to 409, there will be no EM interaction between windings in differential mode, which is desired. On the other hand, if we make 409 too big, we decrease the common-mode impedance and increase the size of the structure, which is also not desired. There is a trade-off between 407 and 409 that can be found by optimizing the layout using for example, an EM simulator.

Figure 5A:
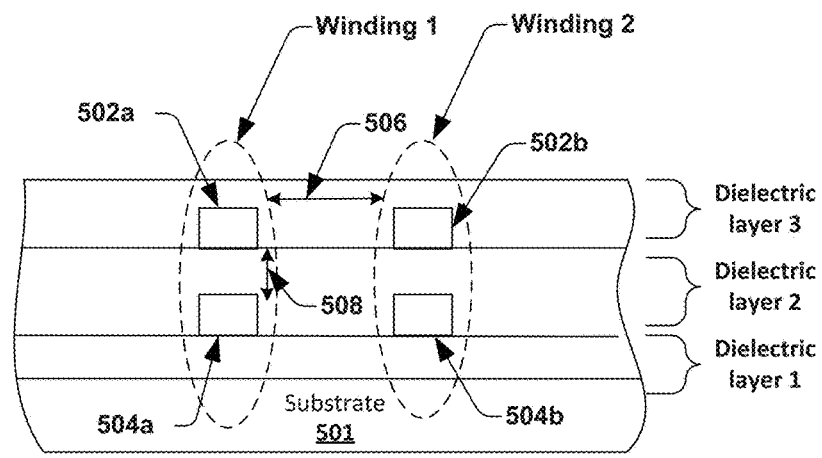
FIGS. 5A-5B shows a schematic illustration of a common mode suppressor on a semiconductor substrate.
Figure 5B:
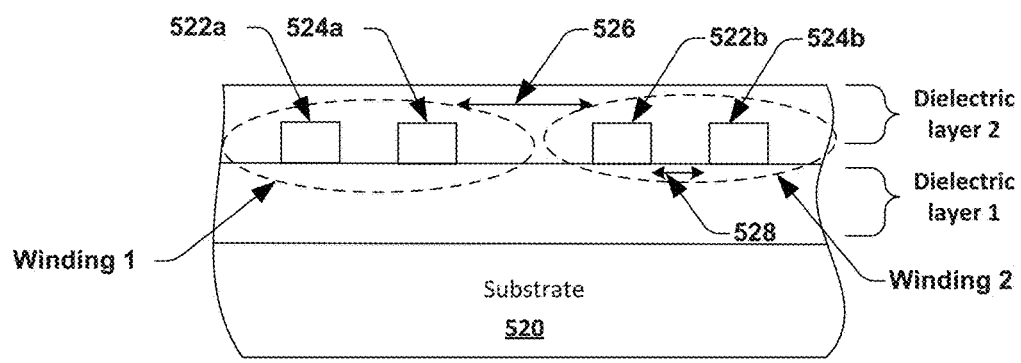
Figure 6A:
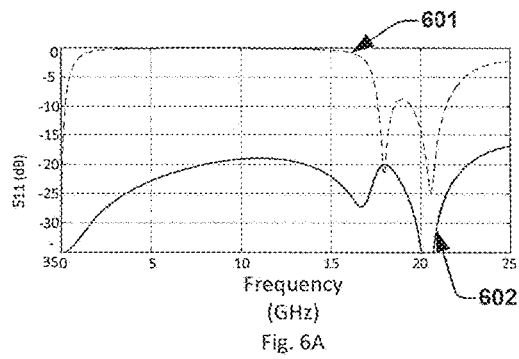
FIGS. 6A-6D shows the simulation results for differential mode and common mode of a common mode suppressor, according to one embodiment of the disclosure.
Figure 6B:
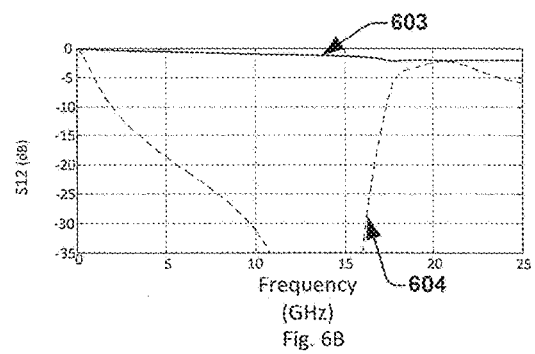
Figure 6C:
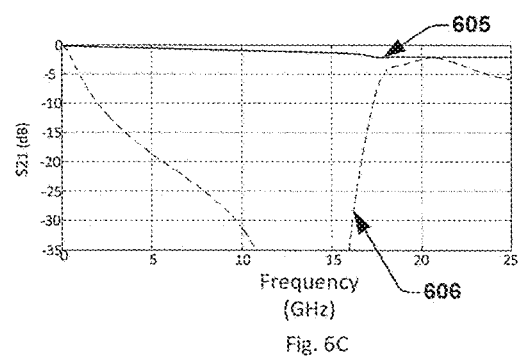
Figure 6D:
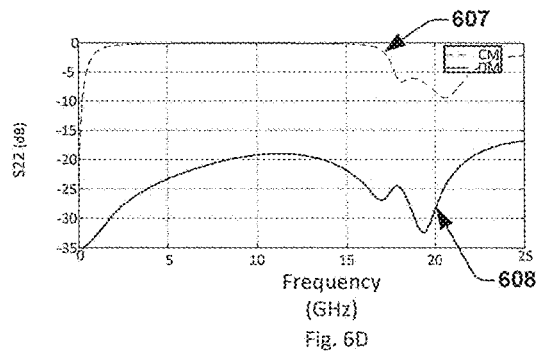

FIGS. 5A and 5B shows a common mode suppressor 500 comprising a long coiled differential transmission line on a semiconductor substrate. FIG. 5A shows one embodiment in which the common-mode suppressor 500 comprises a first conductive wire 502 and the second conductive wire 504 which are inductively and capacitively coupled and are vertically aligned with each other, analogous to FIGS. 3. 502a and 502b are two different sections of the first conductive wire 502, and 504a and 504b are two different sections of the second conductive wire 504. Further, FIG. 5A shows two neighboring windings, winding 1 and winding 2, wherein winding 1 comprises a first section 502a of the first conductive wire 502 and a first section 504a of the second conductive wire 504 and winding 2 comprises a second section 502b of the first conductive wire 502 and a second section 504b of the second conductive wire 504. The first conductive wire 502 is formed in the dielectric layer 3 and the second conductive wire 504 is formed in the dielectric layer 2. In order to achieve the desired common-mode rejection, without affecting the differential signals, the distance between the adjacent windings 506 is made relatively larger than the distance 508 between the first conductive wire 502 and the second conductive wire 504.

FIG. 5B shows another embodiment in which the common-mode suppressor 500 comprises a first conductive wire 522 and the second conductive wire 524 which are inductively and capacitively coupled and are laterally aligned with each other, analogous to FIG. 4A. 522a and 522b are two different sections of the first conductive wire 522, and 524a and 524b are two different sections of the second conductive wire 524. Further, FIG. 5B shows two neighboring windings, winding 1 and winding 2, wherein winding 1 comprises a first section 522a of the first conductive wire 522 and a first section 524a of the second conductive wire 524 and winding 2 comprises a second section 522b of the first conductive wire 522 and a second section 524b of the second conductive wire 524. The first conductive wire 522 and the second conductive wire 524 are formed in the same dielectric layer 2. In order to achieve the desired common-mode rejection, without affecting the differential signals, the distance between the adjacent windings 526 is made relatively larger than the distance 528 between the first conductive wire 522 and the second conductive wire 524.

FIGS. 6A-6D shows the simulation results for differential mode and common mode of a common mode suppressor with the differential impedance of the differential transmission line designed to match a system impedance of 100 ohms. Each graph shows the variation of S-parameter coefficients in the frequency range of 0-25 GHz. Scattering parameters or S-parameters describe the electrical behavior of linear electrical networks when undergoing various steady state stimuli by electrical signals. In particular, S-parameters give the relation between the incident power and the reflected power. For a two-port device, there are four S-parameters S11, S21, S12, and S22. S11 and S22 the forward and the reverse reflection coefficients and S12 and S21 represent the forward transmission coefficient and the reverse transmission coefficient. From FIGS. 6A and 6D it is seen that, for frequencies between 0 GHz and 15 GHz, the forward reflection coefficient S11 for common-mode signal 601 and the reverse reflection coefficient S22 for common-mode signal 607 is 0 dB (i.e., full reflection), which indicates that there is very high reflection for common-mode signals and the forward reflection coefficient S11 for differential mode signal 602 and the reverse reflection coefficient S22 for differential mode signal 608 is around −20 dB, which indicates that there is very low reflection for differential signals. Further, from FIGS. 6B and 6C it is seen that, the forward transmission coefficient S12 for the differential signal 603 and the reverse transmission coefficient S21 for the differential signal 605 is nearly 0 dB (i.e. full transmission) for the frequency range 0-15 GHz which indicates that there is very good transmission of differential signals and the forward transmission coefficient S12 for the common mode signal 604 and the reverse transmission coefficient S21 for the common-mode signal 606 is much lesser than 0 dB, in particular, around −35 dB for the frequency range 10-15 GHz which indicates that there is very poor transmission of common-mode signals through the system.

Figure 7A:
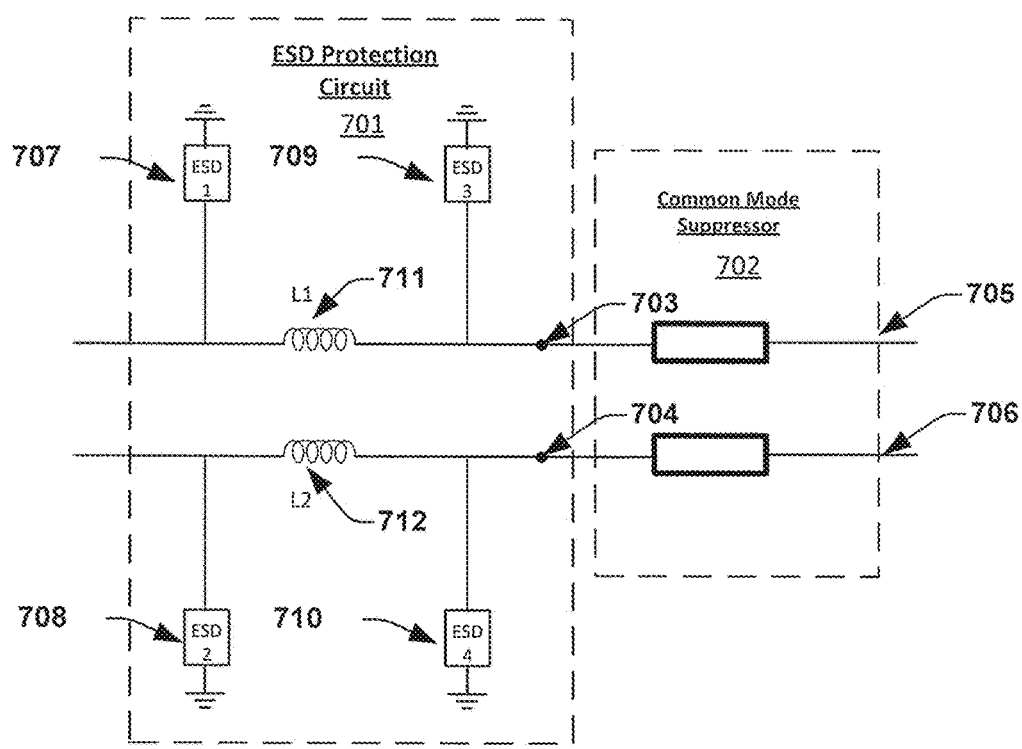
FIG. 7A shows the schematic diagram of a common mode suppressor with an ESD protection circuit according to one embodiment of the disclosure
Figure 7B:
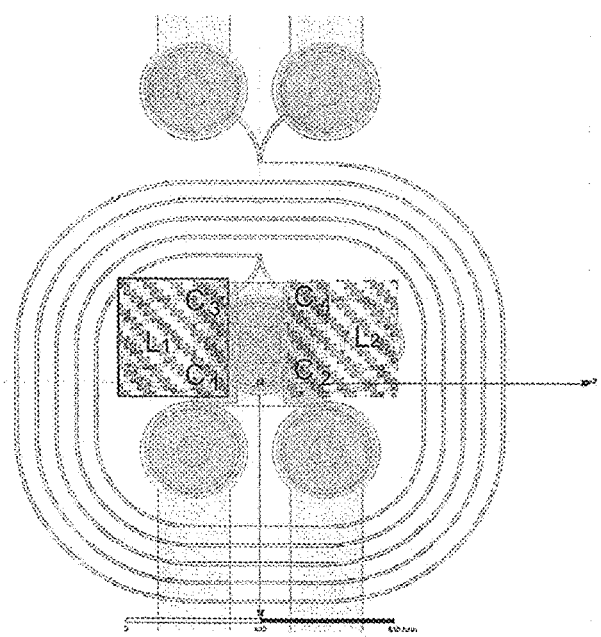
FIG. 7B shows the layout of a common mode suppressor with an ESD protection circuit according to one embodiment of the disclosure.

ESD protection circuit 202 in front of the common-mode suppressor 203 in FIG. 2 deteriorates the characteristics of the common-mode suppressor 203 due to parasitic capacitances of ESD diodes inside 202. Thus, we must compensate these capacitances. FIG. 7A illustrates a possible PI-circuit used to provide ESD protection and compensate the unwanted capacitance of the ESD diodes. ESD devices ESD1-ESD4 in FIG. 7A are used to model ESD diodes. In one embodiment, FIG. 7A depicts an ESD protection circuit 701 associated with a common-mode suppressor 702, connected to the input side of the common-mode suppressor 702 through the input pins 703 and 704. The ESD protection circuit 701 is configured to protect a differential data transmission system from ESD strikes. In particular, a first ESD device 707 connected between a first input pin 703 of the common-mode suppressor 702 and a ground, and a second ESD device 708 connected between a second input pin 704 of the common-mode suppressor 702 and a ground, are configured to provide the ESD protection. In some embodiments, the ESD protection circuit 701 further comprises a third ESD device 709 connected between the first input pin 703 and the ground, and a terminal of the first ESD device 707 and the third ESD device 709 opposite the ground have an inductance 711 connected therebetween. The third ESD device 709 and the inductance 711 provide compensation for the parasitic capacitance of the first ESD device 707. The ESD protection circuit 701 also comprises a fourth ESD device 710 connected between the second input pin 704 and the ground, and a terminal of the second ESD device 708 and the fourth ESD device 710 opposite the ground have an inductance 712 connected therebetween. The fourth ESD device 710 and the inductance 712 provide compensation for the parasitic capacitance of the second ESD device 708. In FIG. 7A, ESD devices 707 and 708 provide ESD protection, however, in other embodiments, ESD devices 709 and 710 can be configured to provide ESD protection. In both embodiments, the ESD devices that provide ESD protection must be ESD diodes. In some embodiments, the third ESD device 709 configured to provide compensation for the parasitic capacitance of the first ESD device 707 is modelled as a capacitor with a capacitance equal to the parasitic capacitance of the first ESD device 707. Similarly, the fourth ESD device 710 configured to provide compensation for the parasitic capacitance of the second ESD device 708 is modelled as a capacitor with a capacitance equal to the parasitic capacitance of the second ESD device 707. FIG. 7B shows the layout of the common-mode suppressor with the ESD protection circuit 700 of FIG. 7A.

Figure 8A:
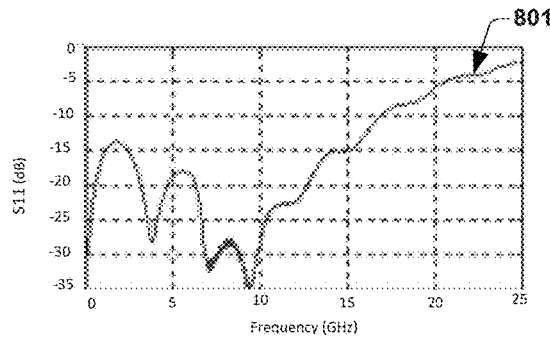
FIGS. 8A-8C shows the simulation results for differential mode of a common mode suppressor with ESD protection, according to one embodiment of the disclosure.
Figure 8B:
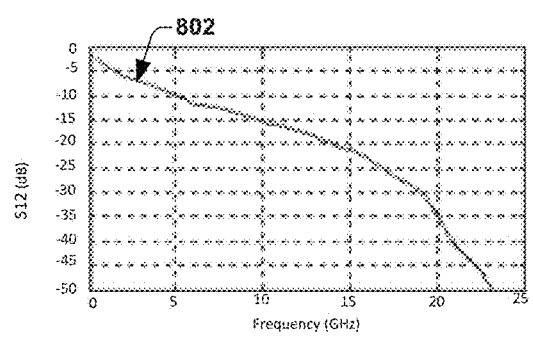
Figure 8C:
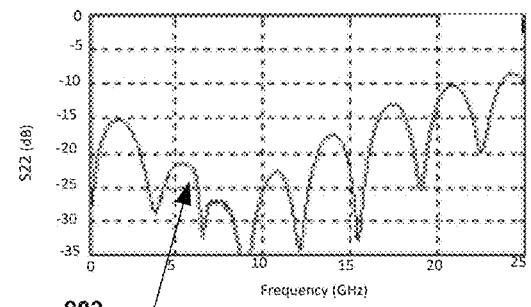
Figure 8D:
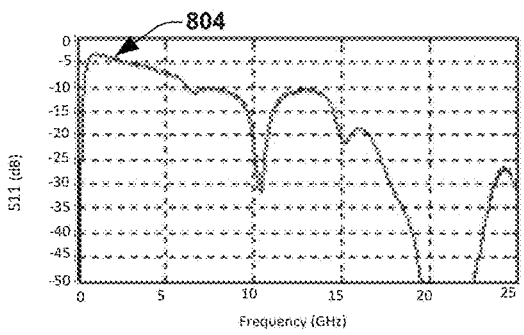
FIGS. 8D-8F shows the simulation results for common mode of a common mode suppressor with ESD protection, according to one embodiment of the disclosure.
Figure 8E:
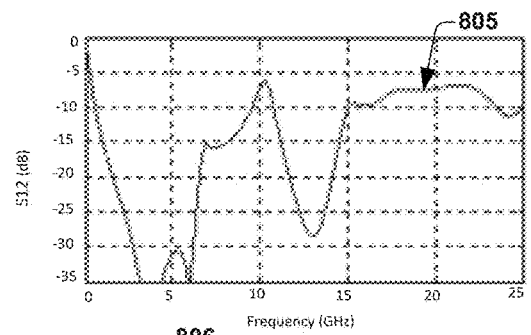
Figure 8F:
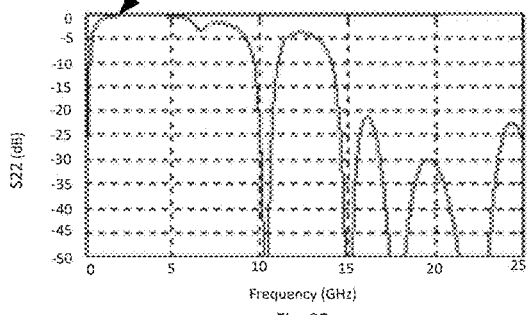

FIGS. 8A, 8B and 8C show the simulation results for differential mode of a common mode suppressor with ESD protection, wherein the differential impedance of the differential transmission line is designed to match a system impedance of 100 ohms. Each graph shows the variation of S-parameter coefficients in the frequency range of 0-25 GHz. The analysis of the graphs can be performed in a similar way to that of FIGS. 6A-6D. From FIGS. 8A, 8B and 8C, particularly from FIG. 8B which shows the variation of the forward transmission gain S12 of differential signals over a frequency range, it is clear that the differential signals are transmitted through the system with very less reflection for the frequency range 1-15 GHz. However, the performance has deteriorated when compared to the simulation results of the common-mode suppressor without ESD protection in FIGS. 6A-6D and this is due to parassitics of ESD diodes. Similarly, FIGS. 8D, 8E and 8F shows the simulation results for common mode of a common mode suppressor with ESD protection, wherein the differential impedance of the differential transmission line is designed to match a system impedance of 100 ohms. Each graph shows the variation of S-parameter coefficients in the frequency range of 0-25 GHz. From FIGS. 8D, 8E and 8F, particularly from FIG. 8E which shows the variation of the forward transmission coefficient S12 of common-mode signals over a frequency range, it is clear that there is good common-mode rejection over the frequency range 0-15 GHz and that very little common-mode noise gets into the system.

FIG. 9A shows the time-domain analysis for a 5 GB/s signal, according to one embodiment of the disclosure. The graph shows the time-domain representation of an input signal 950 and an output signal 952 in a USB. Clearly, the output signal does not have much distortion from the input signal and this shows that the system has very good time-domain performance. Similarly, FIG. 9B shows the time-domain analysis for a 10 GB/s signal, according to one embodiment of the disclosure. The graph shows the time-domain representation of an input signal 960 and an output signal 962 in a USB. Clearly, the output signal does not have much distortion from the input signal and this shows that the system has very good time-domain performance.

Figure 10:
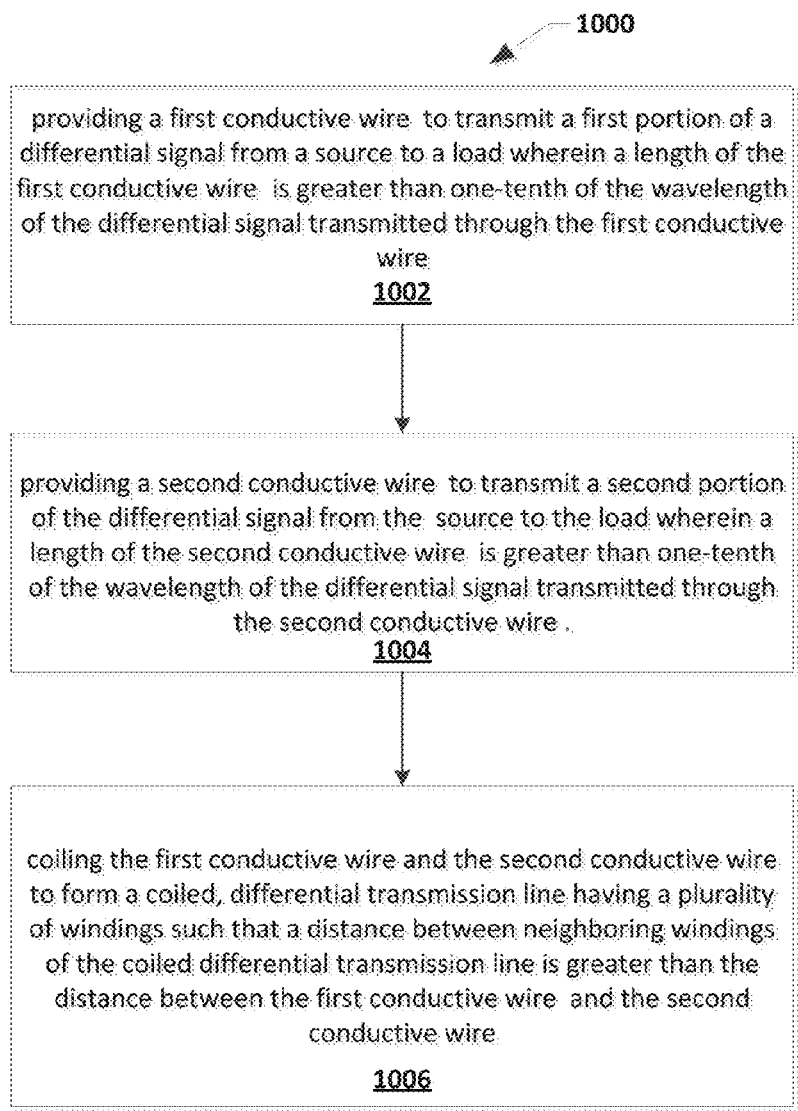
FIG. 10 shows a flowchart illustrating a method for the suppression of common-mode noise in a differential data transmission system, according to one embodiment of the disclosure.

FIG. 10 illustrates a method 1000 for suppressing common-mode noise in a differential data transmission system. At block 1002, a first transmission line is provided to transmit a first portion of a differential signal from a source to a load wherein a length of the first conductive wire is greater than one-tenth of the wavelength of the differential signal transmitted through the first conductive wire. At block 1004, a second conductive wire is provided to transmit a second portion of the differential signal from the source to the load wherein a length of the second conductive wire is greater than one-tenth of the wavelength of the differential signal transmitted through the second transmission line. At block 1006, first conductive wire and the second conductive wire are coiled to form a coiled, differential transmission line having a plurality of windings such that a distance between neighboring windings of the coiled differential transmission line is greater than a distance between the first conductive wire and the second conductive wire.

Figure 11:
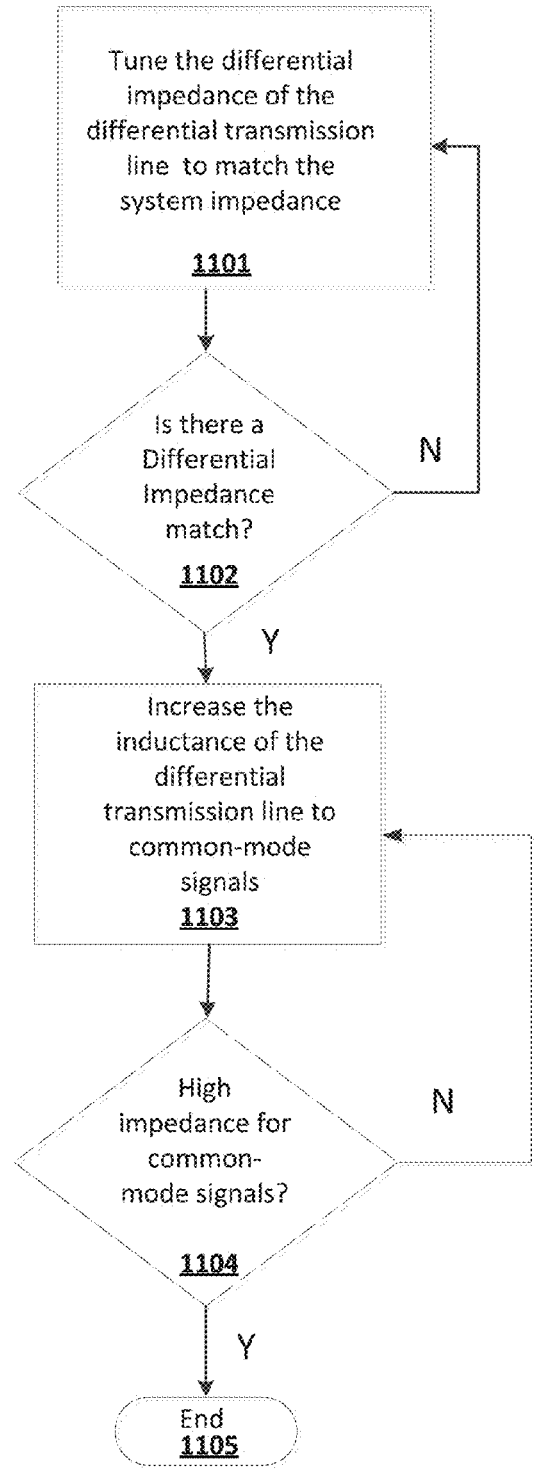
FIG. 11 shows a flowchart illustrating a method for tuning a common-mode suppressor comprising a differential transmission line so as to achieve common-mode noise suppression, according to one embodiment of the disclosure.

FIG. 11 illustrates an example implementation of a method for tuning a differential transmission line so as to achieve common-mode noise suppression. The method 1100 is described herein with reference to the common-mode suppressor 300 of FIG. 3.

At block 1101, the differential impedance of a differential transmission line is tuned in order to match the system impedance. That is, the cross-section of the first conductive wire 301 and the second conductive wire 302 is varied and/or distance between the first conductive wire 301 and the second conductive wire 302 is varied. At block 1102, the differential impedance of the differential transmission line is compared with system impedance. If differential impedance matches with the system impedance (YES at 1102), the method proceeds to block 1103, otherwise (NO at 1102), the method goes back to block 1101 wherein the differential impedance of the differential transmission line is tuned again. At block 1103, the inductance of the differential transmission line to common-mode signals is increased. That is, the length of the differential transmission line comprising the first conductive wire 301 and the second conductive wire 302 is increased and then the differential transmission line is coiled. At block 1104, the impedance of the differential transmission line for common-mode signals is checked. If the impedance is high (YES at 1104), the method proceeds to 1105 where the method ends. Otherwise (NO at 1104), the method goes back to block 1103, wherein the inductance of the differential transmission line to common-mode signals is further increased.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

As highlighted above, the common mode suppressor based on differential transmission line is advantageously different compared to the prior art common-mode suppressors based on the common-mode choke concept. The common mode suppressor based on differential transmission line eliminates the use of magnetic materials as the new concept does not require high magnetic coupling. Further, the suppressor based on the new concept provides very good time domain performance suitable for high-speed interface applications (e.g. USB, HDMI) and also provides very broad band common-mode attenuation over 6 GHz. In addition, the common mode suppressor based on differential transmission line can be realized using available technologies.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The invention claimed is:

1. A differential data transmission system, comprising:
   a source circuit configured to transmit a differential signal containing data;
   a load circuit configured to receive the differential signal; and
   a common-mode suppressor comprising a long coiled differential transmission line configured to transfer the differential signal from the source circuit to the load circuit, which thereby eliminates use of ferromagnetic materials;
   wherein one or more of a cross section of a first conductive wire and a second conductive wire of the differential transmission line and a distance between the first conductive wire and the second conductive wire of the differential transmission line are configured to result in a differential impedance of the differential transmission line being matched to a system impedance;
   wherein a length and the coiled arrangement of the differential transmission line are configured to result in the differential transmission line being un-matched for common-mode noise; and
   wherein the length of the differential transmission line is at least greater than one-tenth of a wavelength of the differential signal being transmitted through the differential transmission line for a predetermined operating frequency range of the differential signal to establish a distributed system model for the common-mode suppressor.

2. The differential data transmission system of claim 1, wherein the first conductive wire and the second conductive wire which are inductively and capacitively coupled to one another and are vertically aligned with respect to one another.

3. The differential data transmission system of claim 2, wherein a distance between neighboring windings in the coiled differential transmission line is greater than a distance between the first conductive wire and the second conductive wire of the differential transmission line.

4. The differential data transmission system of claim 1, wherein the first conductive wire and the second conductive wire which are inductively and capacitively coupled to one another and are laterally aligned with respect to one another.

5. The differential data transmission system of claim 1, further comprising an Electro-static Discharge (ESD) protection circuit attached to first and second input pins of the common-mode suppressor and configured to provide protection from ESD strikes.

6. The differential data transmission system of claim 5, wherein the ESD protection circuit comprises a first ESD device connected between the first input pin of the common-mode suppressor and a ground, and a second ESD device connected between the second input pin of the common-mode suppressor and the ground, wherein the first ESD device and the second ESD device have the same value.

7. The differential data transmission system of claim 6, further comprising a third ESD device connected between the first input pin and the ground, wherein a terminal of the first and third ESD devices opposite the ground have an inductance connected therebetween, in order to compensate a parasitic capacitance of the first ESD device.

8. The differential data transmission system of claim 7, further comprising a fourth ESD device connected between the second input pin and the ground, wherein a terminal of the second and fourth ESD devices opposite the ground have an inductance connected therebetween, in order to compensate a parasitic capacitance of the second ESD device and wherein the third ESD device and the fourth ESD device have the same value.

9. A common-mode suppressor for eliminating common-mode noise in high frequency differential data transmission systems, comprising:
    a long coiled differential transmission line configured to transfer data between a source circuit and a load circuit, which thereby eliminates use of ferromagnetic materials;
    wherein one or more of a cross section of a first conductive wire and a second conductive wire of the differential transmission line and a distance between the first conductive wire and the second conductive wire of the differential transmission line are configured to result in a differential impedance of the differential transmission line being matched to a system impedance;
    wherein a length and the coiled arrangement of the differential transmission line are configured to result in the differential transmission line being un-matched for common-mode noise; and
    wherein the length of the differential transmission line is at least greater than one-tenth of a wavelength of a signal being transmitted through the differential transmission line for a predetermined operating frequency range of the signal to establish a distributed system model for the common-mode suppressor.

10. The common-mode suppressor of claim 9, wherein the first conductive wire and the second conductive wire are inductively and capacitively coupled to one another and are vertically aligned with respect to one another.

11. The common-mode suppressor of claim 9, wherein the first conductive wire and the second conductive wire are inductively and capacitively coupled to one another and are laterally aligned with respect to one another.

12. The common-mode suppressor of claim 9, wherein a distance between neighboring windings in the coiled differential transmission line is greater than a distance between the first conductive wire and the second conductive wire of the differential transmission line.

13. The common-mode suppressor of claim 9, further comprising an Electro-static Discharge (ESD) protection circuit attached to first and second input pins of the common-mode suppressor and configured to provide protection from ESD strikes.

14. The common-mode suppressor of claim 13, wherein the ESD protection circuit comprises a first ESD device connected between the first input pin of the common-mode suppressor and a ground, and a second ESD device connected between the second input pin of the common-mode suppressor and the ground, wherein the first ESD device and the second ESD device have the same value.

15. The common-mode suppressor of claim 14, further comprising a third ESD device connected between the first input pin and the ground, wherein a terminal of the first and third ESD devices opposite the ground have an inductance connected therebetween, in order to compensate a parasitic capacitance of the first ESD device.

16. The common-mode suppressor of claim 15, further comprising a fourth ESD device connected between the second input pin and the ground, wherein a terminal of the second and fourth ESD devices opposite the ground have an inductance connected therebetween, in order to compensate a parasitic capacitance of the second ESD device and wherein the third ESD device and the fourth ESD device have the same value.

17. A method for suppressing common-mode noise in a differential data transmission system comprising:
    providing a first conductive wire to transmit a first portion of a differential signal from a source circuit to a load circuit;
    providing a second conductive wire to transmit a second portion of the differential signal from the source circuit to the load circuit;
    coiling the first conductive wire and the second conductive wire;
    wherein the first and second coiled conductive wires together form a long coiled differential transmission line having a plurality of windings, which thereby eliminates use of ferromagnetic materials;
    wherein a distance between neighboring windings of the coiled differential transmission line is greater than a distance between the first conductive wire and the second conductive wire;
    wherein the first conductive wire and the second conductive wire have a cross-sectional area associated therewith, and wherein the distance between the first conductive wire and the second conductive wire and the cross-sectional area of the first conductive wire and the second conductive wire are configured such that a differential impedance of the first conductive wire and the second conductive wire is matched to a system impedance;
    wherein the plurality of windings of the coiled differential transmission line and a length of the coiled differential transmission line are configured such that the coiled differential transmission line is unmatched for common-mode noise; and
    wherein the length of the coiled differential transmission line is greater than one-tenth of a wavelength of the differential signal being transmitted through the coiled differential transmission line for a predetermined operating frequency range of the differential signal to establish a distributed system model for the coiled differential transmission line.

18. The method of claim 17, wherein the first conductive wire and the second conductive wire are inductively and capacitively coupled to one another.

* * * * *